(12) United States Patent
Dussel et al.

(10) Patent No.: US 8,408,374 B2
(45) Date of Patent: Apr. 2, 2013

(54) COUPLING ASSEMBLY HAVING TRANSPORT LOCK

(75) Inventors: Klaus Dussel, Karlsruhe (DE); Victor Wiege, Buehl (DE); Aurelie Christophel, Oberhoffen sur Moder (FR); Ivo Agner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 24 days.

(21) Appl. No.: 13/098,657

(22) Filed: May 2, 2011

(65) Prior Publication Data

US 2011/0209963 A1    Sep. 1, 2011

Related U.S. Application Data

(63) Continuation of application No. PCT/DE2009/001431, filed on Oct. 12, 2009.

(30) Foreign Application Priority Data

Nov. 3, 2008 (DE) .................. 10 2008 054 326
Nov. 27, 2008 (DE) .................. 10 2008 059 304

(51) Int. Cl.
*F16D 13/58* (2006.01)

(52) U.S. Cl. ................. 192/70.22; 192/109 R
(58) Field of Classification Search ............. 192/70.22
See application file for complete search history.

(56) References Cited

U.S. PATENT DOCUMENTS

| 4,560,055 | A  | * | 12/1985 | Billet ......................... 192/109 R |
| 5,921,365 | A  | * | 7/1999  | Bayer ...................... 192/70.252 |
| 6,116,396 | A  | * | 9/2000  | Mischler .................. 192/70.252 |
| 6,325,193 | B1 | * | 12/2001 | Gochenour ............. 192/70.252 |
| 6,371,269 | B1 | * | 4/2002  | Weidinger .............. 192/70.252 |
| 6,425,470 | B2 | * | 7/2002  | Weidinger .............. 192/70.252 |
| 6,915,889 | B2 | * | 7/2005  | Weidinger et al. ...... 192/70.252 |
| 8,201,676 | B2 | * | 6/2012  | Uenohara ................. 192/70.27 |

FOREIGN PATENT DOCUMENTS

| DE | 42 39 289 A1   | 5/1993 |
| DE | 42 39 291 A1   | 5/1993 |
| DE | 43 22 677 A1   | 1/1994 |
| DE | 44 31 641 A1   | 3/1995 |
| DE | 197 31 610 A1  | 1/1999 |
| WO | 2008/058508 A1 | 5/2008 |

* cited by examiner

*Primary Examiner* — David D Le
*Assistant Examiner* — Ryan Dodd
(74) *Attorney, Agent, or Firm* — Lucas & Mercanti, LLP

(57) ABSTRACT

A coupling assembly which has an adjusting device. In order to prevent uncontrolled adjusting of the adjusting device during transport until installation, a transport lock is provided. In order to be able to further propose an installation space-neutral solution, which, in particular, has no negative impact on the actuating system, grabber arms are disposed for lever elements of the coupling assembly axially in the direction of the counterpressure plate.

19 Claims, 7 Drawing Sheets

COUPLING ASSEMBLY HAVING TRANSPORT LOCK

This application is a continuation of PCT/DE2009/001431 filed Oct. 12, 2009, which in turn claims the priority of DE 10 2008 054 326.8 filed Nov. 3, 2008 and DE 10 2008 059 304.4 filed Nov. 27, 2008, the priority of these applications is hereby claimed and these applications are incorporated by reference herein.

FIELD OF THE INVENTION

The invention relates to a clutch unit having a transport lock which acts in the non-installed state.

BACKGROUND OF THE INVENTION

Clutch units are used in particular in drivetrains of motor vehicles between an internal combustion engine and a transmission. Depending on the design of the transmission, a provision may be made for a single friction clutch to couple the crankshaft to a transmission input shaft, or a multiple clutch, such as a double clutch with two friction clutches, to distribute torque to two transmission input shafts or to a transmission input shaft and an auxiliary drive output in the clutch unit. Here, at least one friction clutch has an adjusting device which in particular compensates for the wear of the friction linings of the clutch disk connected to the associated transmission input shaft for conjoint rotation therewith, this being achieved by virtue of a ramp device being provided between the pressure plate and lever elements which apply load to the latter, which ramp device compensates for the incorrect spacing resulting from wear. Here, the initiation of an adjusting process by rotating the ramp device is determined by sensor devices which measure a travel or an actuating force of the lever elements. Such adjusting devices are known from documents DE 42 39 291 A1, DE 42 39 289 A1, DE 43 22 677 A1 and DE 44 31 641 A1.

To prevent an uncontrolled adjustment of such adjusting devices in particular of so-called pushed-closed friction clutches, which are open when not subjected to load by the actuating system and are closed by the application of load to the lever tips of the lever elements, it is possible to use transport locks which fix the lever elements axially in a position which prevents a complete relaxation of the lever elements. Such transport locks may for example be formed from components such as rings which are fixedly connected to the housing of the clutch unit and which prevent the lever tips from pivoting out axially. As a result of the necessary arrangement of said components, the installation space available for the actuating system which engages in said region is limited. Simpler designs provide separable or spring-loaded transport locks which act only once and are no longer available after being dismounted.

SUMMARY OF THE INVENTION

It is therefore the object to propose a clutch unit with an adjusting device in which the adjusting device is protected against an uncontrolled adjustment by means of a transport lock which can be provided without taking up any further installation space in relation to the actuating system. Furthermore, a transport lock of said type should remain effective over multiple installation and removal processes of the clutch unit.

The object is achieved by means of a clutch unit having at least one friction clutch, comprising at least one pressure plate which is connected to a housing for conjoint rotation therewith but so as to be axially movable to a limited extent, it being possible for the housing to be connected to a counterpressure plate, and with lever elements provided in an annular arrangement being arranged between the housing and pressure plate, which lever elements are pivotably supported on a rolling support which is borne by the housing and which can be adjusted axially by an adjusting device for the compensation of wear, and which lever elements can be subjected to load at their radially inner lever tips in order to close the friction clutch, wherein the lever tips are secured axially, in a non-installed state, by a transport lock, and the lever tips are secured axially by means of catch arms which are aligned axially in the direction of the counterpressure plate and which engage axially behind and are supported on the rear side of the housing.

The lever elements, which are arranged outside the housing, are clamped in a predefined position in relation to the housing arranged axially within by means of the transport lock, which position prevents a complete relaxation of the lever elements and therefore an uncontrolled adjustment of the friction clutch comprising the lever elements, but is more relaxed than an end position of the lever tips of the lever elements permitted by the actuating system. In this way, in the normal operating state of the friction clutch, the lever tips do not reach the stop state at which the lever tips are delimited axially by the transport lock.

If the clutch unit is dismounted again, the action of the transport lock takes effect again and, in this state, too, prevents an uncontrolled adjustment, such that the clutch unit can for example be assessed in the state which it was in before being dismounted, and can be used again effectively after an exchange of the clutch disk with possibly worn friction linings.

As a result of the arrangement of the transport lock with components which extend only within the installation space of the clutch unit even during operation in the installed state, the installation space outside the installation space of the clutch unit can be provided entirely for the actuating system. This is particularly advantageous if a plurality of, for example more than two, friction clutches are arranged in the clutch unit, the lever elements of which are subjected to load by two mutually separately operating actuating systems.

In an advantageous exemplary embodiment, the catch arms may be held at one end on the lever tips and supported at a free end on the rear side of the housing by means of a catch hook. To be able to leave the inner circumference of the housing free in an undisrupted manner even under restricted installation space conditions, the catch arms for forming the axial stop by means of the catch hook which engages behind the housing are preferably guided in openings which are radially spaced apart from the inner circumference. Here, a profile of the openings is designed such that the catch hooks form an axial stop on the openings, that is to say cannot pass through the openings.

To insert the catch arms with catch hooks which extend beyond the openings and which engage behind the housing, slots which form a widening in the radial direction on the inner circumference of the housing and which connect the inner circumference and the respective opening may be provided, via which slots the catch arms are inserted into the openings. For this purpose, an advantageous assembly method makes provision for the catch arms, in order to form the catch hooks, to be provided at their free end with a larger area in the circumferential direction than the openings. Thereafter, during an axial movement of the lever elements for the positioning thereof on the housing, the catch arms attached to the lever elements bear under radial preload against the inner circumference. As a result of the axial movement of the lever elements, firstly the catch hooks slide past the slots until the catch arms, as a result of the smaller dimension of the catch arms, snap into the slots and subsequently into the openings.

Here, it has proven to be advantageous for the catch arms to be attached at a radial distance from a contact surface of the actuating bearing, wherein during the insertion of the catch arms during the mounting for example of a lever spring with the lever elements, the catch arms are at least partially plastically deformed on the inner circumference of the housing and thereby calibrated, such that they spring elastically into the openings to a predefined extent.

In a further exemplary embodiment, the catch arms may be formed with the same profile throughout, for example from sheet metal with a rectangular profile, wherein the openings are matched in a complementary manner to said profile and, after the catch arms are passed through the openings, the free end of the longitudinal axis of the catch arms is twisted, such that the catch hooks thereby formed form an undercut in relation to the openings.

To form the transport lock, a plurality of catch arms distributed over the circumference may be held, for example riveted to, individual lever elements. Here, lever elements adjacent to one another may have a corresponding spacing to one another or may be cut out in such a way that the respective catch arm can be guided therebetween in an axially undisrupted manner to the opening.

The catch arms have, at their ends situated opposite the catch hooks, a head part by means of which the catch arms are connected, for example riveted, to the corresponding lever element. Here, the head parts may be arranged on both sides of the lever elements. It has proven to be particularly advantageous for the head parts to be attached to that side of the lever elements which faces away from the housing on which the catch hooks are supported, such that the entire surface of the head part can be supported on the lever element and therefore the diameter of the rivet head, which serves as a support surface of the respective catch arm during the housing-facing fastening of the head part, of riveted catch arms is insignificant. In this way, the catch arms can, for the same material loading of the lever element by the opening for riveting, be arranged radially further inward.

According to the concept of the invention, provision is made for a reliable deflection of the catch arms into the openings provided for this purpose in the housing to be ensured even when the centering of the lever springs on the housing exhausts the predefined tolerance range. For this purpose, the catch arms are positioned on the lever elements. Here, the radial spacing of the catch arms to the lever elements and in particular the twisting of the catch arm relative to the lever element can be set. Here, in one advantageous exemplary embodiment, in each case one positioning surface may be provided on the lever elements in the region of the head part, a positioning surface of the head part being brought into alignment with said positioning surface. It is for example possible for a centering tool to be inserted in each case between two lever elements, which centering tool serves, for both positioning surfaces, as a common stop during the riveting of the catch arms to the lever elements. It is self-evident that the necessary tolerance play is provided for this purpose between the corresponding rivet openings in the lever elements and the rivets.

As an alternative to this, the head part of the catch arms may have an axially folded-over projection which bears against the positioning surface of the lever element during the riveting. To attain positioning independently of the radial tolerance of the lever elements, one or more centering windows may be provided in the lever spring, with respect to which centering windows the individual catch arms are positioned by virtue for example of the position thereof in relation to the one or more centering windows being defined during the riveting by means of a centering tool, for example a jig.

Alternatively, the catch arms may be held on an annular part which is supported axially on that side of the lever elements which faces away from the housing. The annular part and catch arms may particularly advantageously be formed in one piece, it being possible for this purpose for said annular part and catch arms to be punched from sheet metal and realized by means of deformation processes. Furthermore, a component of said type may be produced from plastic, for example by means of an injection molding process.

In one advantageous embodiment, the transport device is moved with the lever tongues during an actuation of the friction clutch. For this purpose, as mentioned above, the catch arms are held individually on lever elements, or the complete annular part is moved with the catch arms. Here, the annular part is supported axially on an actuating bearing of the actuating system, or the annular part is held axially between the actuating bearing and the lever tips.

Here, in the first embodiment, the annular part may be arranged radially outside the actuating bearing and have a plurality of circumferentially distributed, radially inwardly aligned tongues which are driven by the actuating bearing. Said tongues may be arranged—as viewed circumferentially—in intermediate spaces left free between the lever tips. Here, the catch arms may be arranged on the inner circumference of the annular part and, in the intermediate spaces between the lever elements, inserted axially into the openings of the housing.

In the second embodiment, the annular part may be arranged at a diameter of the actuating bearing and may be subjected to load axially by the latter, wherein the annular part is in abutting contact with the lever tips and applies load to these when subjected to load by the actuating bearing. So as not to restrict the free inner diameter of the lever tips, of the annular part matched thereto and of the housing, the catch arms may be arranged on the outer circumference of the annular part and, as mentioned above, extend axially and an intermediate space of the lever elements.

BRIEF DESCRIPTION OF THE DRAWINGS

The invention will be explained in more detail on the basis of the exemplary embodiments shown in FIGS. 1 to 16, in which.

DETAILED DESCRIPTION OF THE INVENTION

Figure 1:
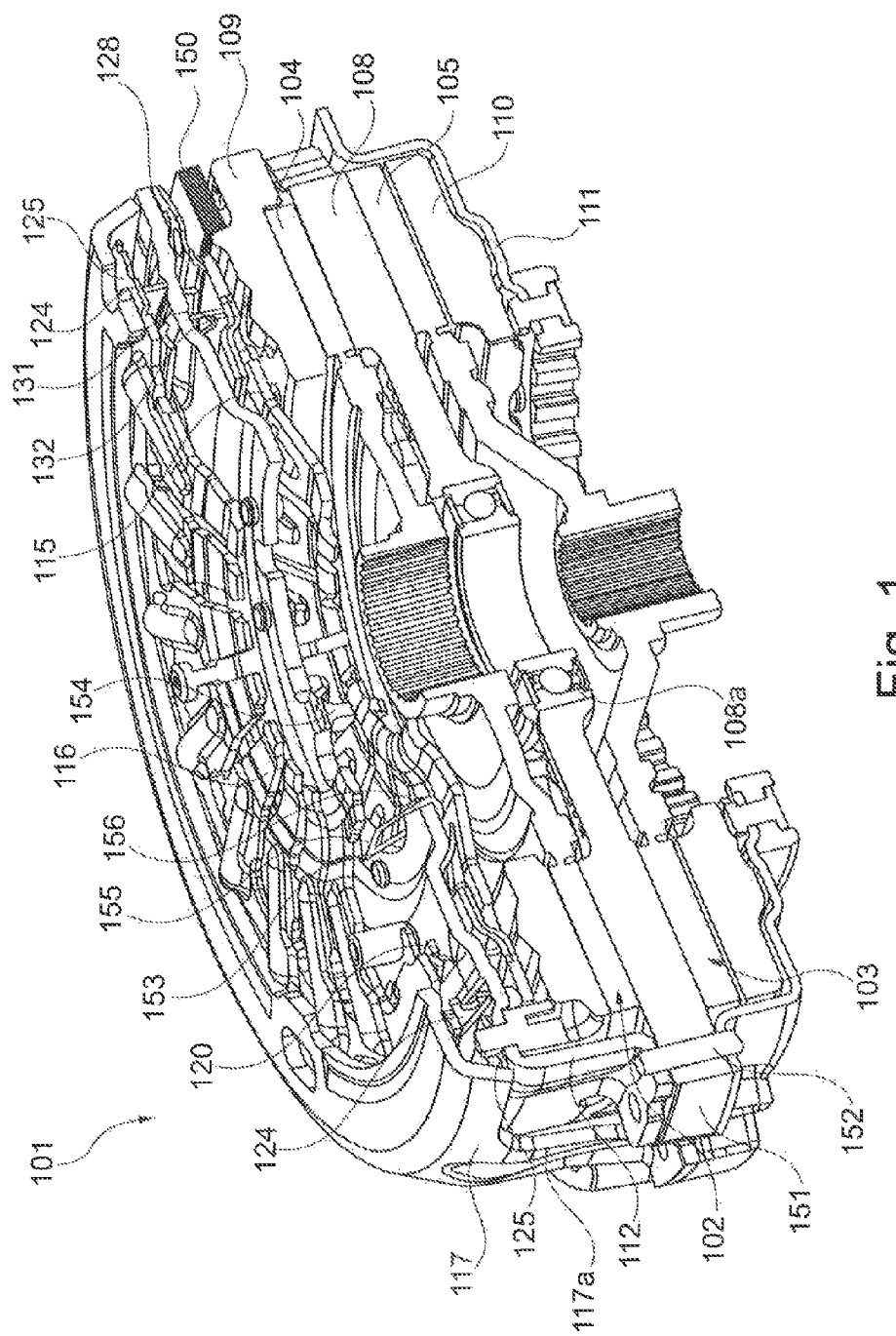
FIG. 1 shows a clutch unit having transport locks in a perspective illustration.

FIG. 1 shows a perspective illustration of a clutch unit 101 in the form of a double clutch having the friction clutches 102, 103, the clutch disks 104, 105, the counterpressure disk 108 arranged between the pressure plates 109, 110, the housing-like or cover-like drive plate 111, the housing 112 which is axially fixedly connected to the counterpressure plate 108, the cage-like or housing-like traction means 117 which is fixedly connected to the pressure plate 110, the plate-spring-like lever elements 115, 116, the adjusting device with the adjusting rings 120, 128, the sensor rings 124, 131, the sensor element 132 which serves as a clamping spring for the sensor ring 131, the sensor element 125 which serves as a clamping spring for the sensor ring 124, and the bearing 108*a*. Also shown is a tangentially arranged leaf spring pack 150 which is fixedly connected with one circumferential end to the pressure plate 109 and with the other circumferential end to the housing 112. The leaf spring pack 150 is axially preloaded in such a way that, as already mentioned, the pressure plate 109 is loaded against the lever element 115, in such a way that the adjusting ring 128 is clamped between the lever elements 115 and the housing 112. It is preferable for three such leaf spring packs 150 to be provided distributed uniformly over the circumference.

FIG. 1 also shows a connecting point 151 in the region of which the drive plate 111, the counterpressure plate 108 and the housing 112 are fixedly connected to one another. A positioning pin 152 is shown in the region of the connecting point 151. It can also be seen from FIG. 1 that the housing-like traction means 117 has axial feet or lugs 117*a* by means of which it is fixedly connected to the pressure plate 110. It can also be seen from FIG. 1 that at least the pressure plates 109, 110 and the counterpressure disk 108 have, on their circumference, radial projections which are offset circumferentially with respect to one another and serve for producing the required axial connections to the associated components.

To ensure that no unintended adjustment at least within the adjusting devices assigned to the two friction clutches 102, 103 occurs during the transportation of the clutch unit 101 from the manufacturer to the mounting process on the engine at the automobile manufacturer, transport locks 153, 154 are provided which are illustrated in an unlocked position in FIG. 1. The unlocked position is to be understood to mean the position assumed by the transport locks 153, 154 after the clutch unit 101 has been mounted on the drive output shaft of an internal combustion engine or engine and a first actuation has taken place, preferably after at least the engine and transmission have been connected. Even though it may be expedient for such transport locks to also be unlocked by manual means, it is particularly advantageous for said transport locks to automatically ensure the unlocking action. This may take place for example on account of inherent elasticities. The transport locking means 153, 154 are thus mounted, during the mounting of the clutch unit 101, in a braced position such that the transport locking means 153, 154 can be relieved of load by means of actuation of the corresponding friction clutch. The transport locking means may then elastically relax, and thereby release the initially blocked adjusting devices.

It can be seen from FIG. 1 that for example the transport locking means 153 for the friction clutch 103 are formed by spring hoops which are supported by the housing-like component 112 and which have a frame-like region 155. Said frame-like region 155 can be pivoted radially inward, specifically over the supports 156 provided on the levers of the lever springs 116. In this way, the supports 156 can be supported axially with preload against the transport locking means 153, as a result of which, for transportation, the lever springs 116 can be held in a defined axially braced state which ensures that in particular the different rings of the adjusting device remain axially braced and therefore cannot cause any undesired adjustment.

During the first actuation of the friction clutch 103, the lever spring 116 is pivoted such that the tongues 156 relieve the frame-like region 155 of load, as a result of which said frame-like region 155 can spring back radially outward and assume the state illustrated in FIG. 1. The transport locks 154 for the friction clutch 102 or the adjusting device assigned thereto operate according to an identical or similar principle.

Figure 2:
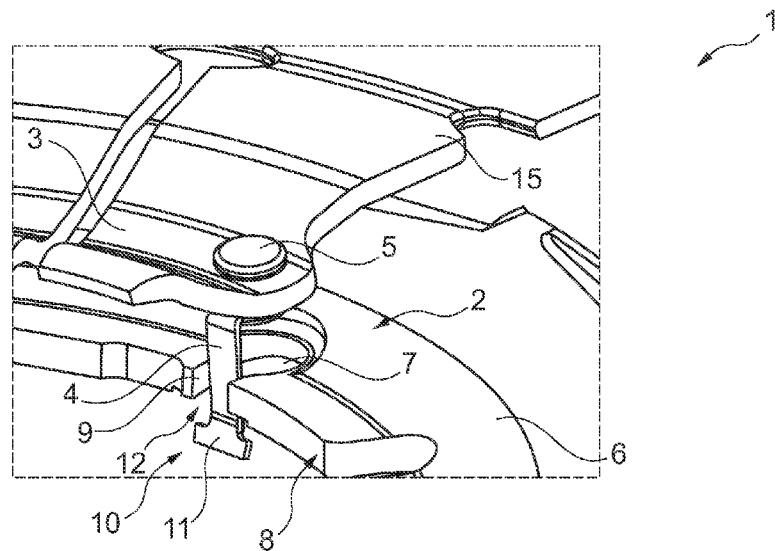
FIG. 2 shows a detail of a clutch unit having a transport lock according to the invention.

FIG. 2 shows a detail of a clutch unit 1 which is similar to the clutch unit 101 of FIG. 1 and which has the transport lock 2 according to the invention. To form the transport lock 2, a plurality of circumferentially distributed catch arms 4 are held on, for example riveted by means of the rivets 5 to, the lever tips 3 of the lever elements 15. The catch arms 4 extend through the housing 6, which is similar to the housing 112 of FIG. 1, through the openings 7 which are provided radially spaced apart from the inner circumference 8 of the housing 6. The openings 7 are open to the inner circumference 8 by means of radially extending slots 9, such that the catch arms 4 can be inserted into the openings 7 proceeding from the inner circumference 8. For this purpose, the catch arms 4 may be of elastic design and preloaded radially against the inner circumference 8 during mounting.

On the free end 10, which is situated opposite the end facing toward the lever tips 3, of the catch arms 4 is provided a catch hook 11 which is widened as viewed in the circumferential direction and which forms an axial stop 12 on the opening 7. The catch arms 4 may be punched from sheet metal and pressed into their final shape.

Figure 3:
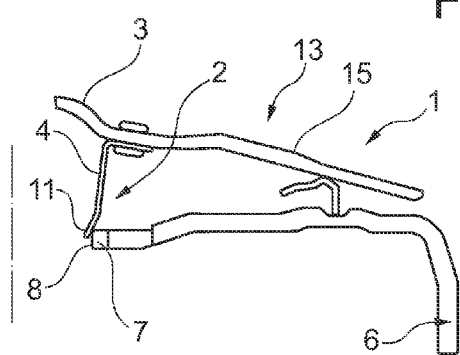
FIGS. 3 to 6 show a schematic illustration of the mode of operation of the transport lock of the clutch unit of FIG. 2 in different operating states.
Figure 4:
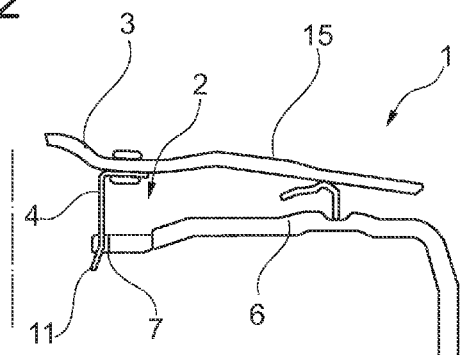

FIGS. 3 to 6 show the clutch unit 1 and the function of the transport lock 2 of FIG. 2, in each case on the basis of a schematic half-section, in different states of mounting and during operation. FIG. 3 shows the clutch unit 1 during the mounting of the lever elements 15, which are joined together to form a lever spring 13, onto the housing 6. During the centering of the lever spring 13 on the housing 6, the catch arms 4 are radially preloaded with respect to the inner circumference. During the axial movement of the lever spring 13 with respect to the housing 6, the catch hook 11, as a result of its extended profile, prevents a snapping-in into the opening 7. When the catch hook 11—as shown in FIG. 4—has passed the slot 9 shown in FIG. 2, the catch arms 4 snap into the openings 7 with a release of the preload, as a result of which the catch hooks 11 form an undercut and therefore an axial stop on the rear side of the housing 6, such that the lever elements 15 are held in a slightly preloaded position and therefore prevent an uncontrolled adjustment of the adjusting device assigned thereto.

Figure 5:
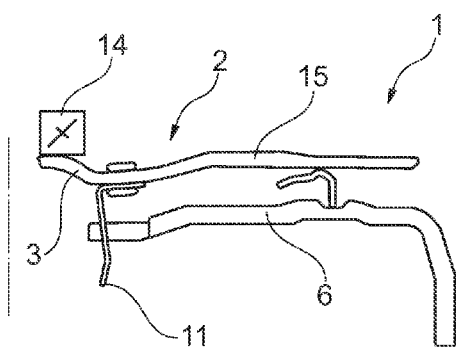
Figure 6:
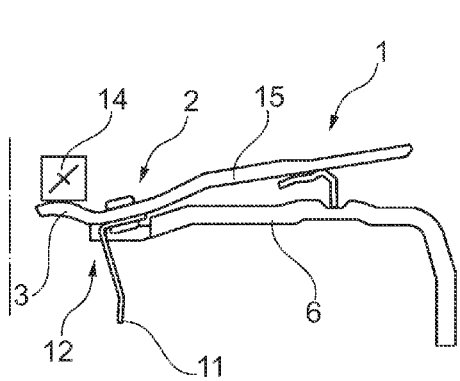

FIG. 5 shows the clutch unit 1 in the installed position when the friction clutch is disengaged. The lever elements 15 are loaded at least slightly in the actuating direction, such that the catch lugs 11 are lifted from the housing 6, by the actuating system which loads the actuating bearing 14 which axially moves the lever tips 3. FIG. 6 shows the engaged state of the friction clutch of the clutch unit 1 with the lever tips 3 under maximum loading. During the further course of clutch operation, the lever tips 15 are moved between the positions shown in FIGS. 5 and 6 by the actuating system by means of the actuating bearing 14. In the event of a dismounting of the clutch unit 1, the catch hooks 11 return to the axial stop on the housing 6 and prevent a complete relaxation of the lever elements 15, such that the clutch unit 1 and therefore the friction clutch assigned to the lever elements 15 are dismounted and assessed in their present operating state. Furthermore, the transport lock 2 is available again in the event of a reinstallation of the clutch unit.

The transport lock 2 has no parts which project into the installation space of the actuating system, and therefore takes up no additional installation space in relation to the actuating system. Sufficient space is available for the catch arms in the installation space axially in the direction, in which the catch arms 4 extend during an actuation, of the counterpressure plate 108 (FIG. 1).

Figure 7:
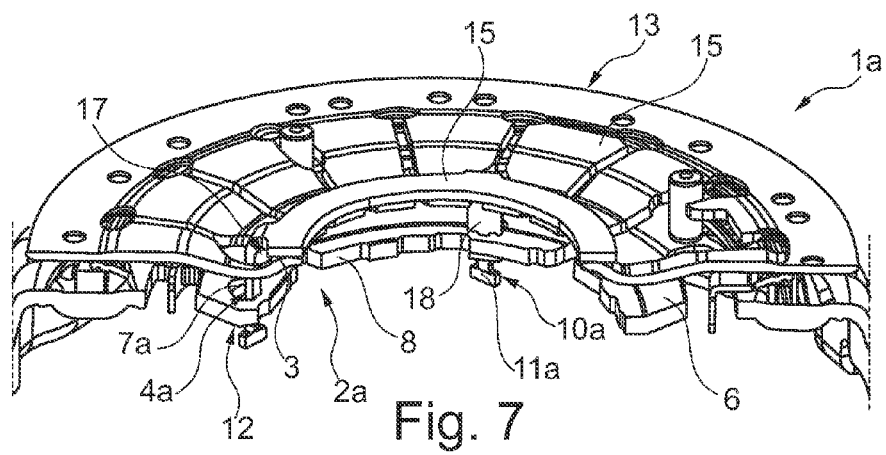
FIG. 7 shows an alternative exemplary embodiment of a clutch unit to the clutch unit shown in FIGS. 2 to 6.

FIG. 7 shows a detail of a clutch unit 1a slightly modified in relation to the clutch unit 1 shown in FIGS. 2 to 6, having a transport lock 2a comprising an annular part 16 on which, in the exemplary embodiment shown, the catch arms 4a are integrally arranged in a circumferentially distributed manner. The annular part 16 is designed in terms of its diameter such that it comes to bear against the lever tips 3 of the lever elements 15 which are joined together to form a lever spring 13. The catch arms 4a, at the outer circumference of the annular part 16, are guided through intermediate spaces 17 of the lever elements 15 and axially through openings 7a of the housing 6.

The formation of the leadthrough of the catch arms 4a and the formation of the undercut of the catch arms 4a in relation to the housing 6 takes place independently of the use of an annular part 16 in an alternative way to that in FIGS. 2 to 6, by virtue of the profile 18 of the catch aims 4a being adapted to the cross section of the openings 7a, which are closed in the direction of the inner circumference 8 of the housing 6, in such a way that, after a twisting of the free end 10a of the catch arms 4a about their longitudinal axis, a catch hook 11a is formed which can no longer pass the opening 7a and therefore an axial stop 12 is formed by the housing 6, and secondly, the catch hook 11a forms an undercut with respect to the housing, which undercut is supported axially on that side of the housing 6 which faces away from the lever spring 13, and which undercut holds the lever spring 13 or the lever elements 15 under a slight preload, and thereby prevents an uncontrolled adjustment of the adjusting device, in the non-installed state of the clutch unit 1a.

Figure 8:
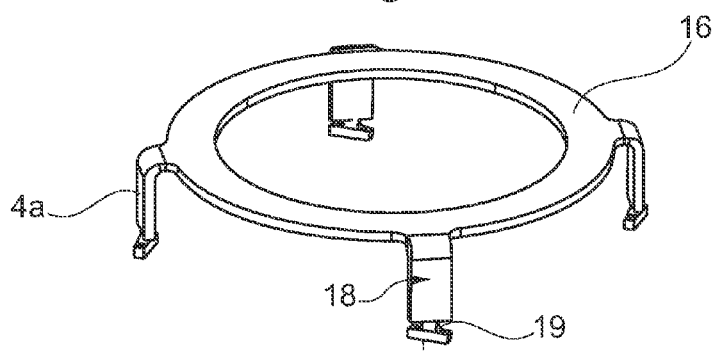
FIG. 8 shows an annular part of the transport lock of FIG. 7, FIGS. 9 to 11 show a schematic illustration of the mode of operation of the transport lock of the clutch unit of FIG. 7 in different operating states.

FIG. 8 shows the annular part 16 of FIG. 7 in detail. The catch arms 4a of the annular part are angled and have a rectangular profile 18 which, in the region of the free end 10a, has a constriction 19, such that twisting of the catch hook 11a is simplified and can take place at a defined position.

Figure 9:
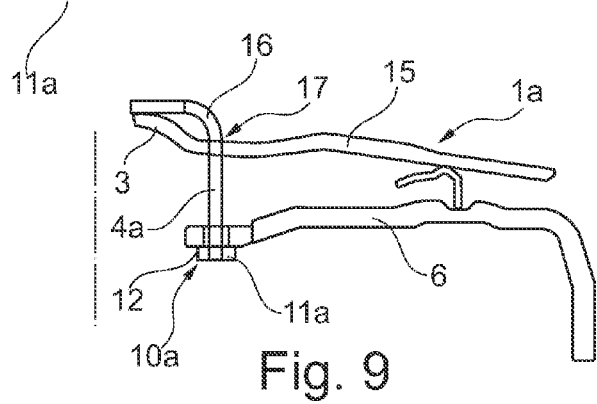
Figure 10:
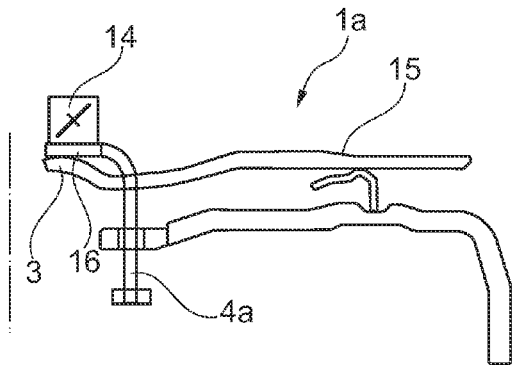
Figure 11:
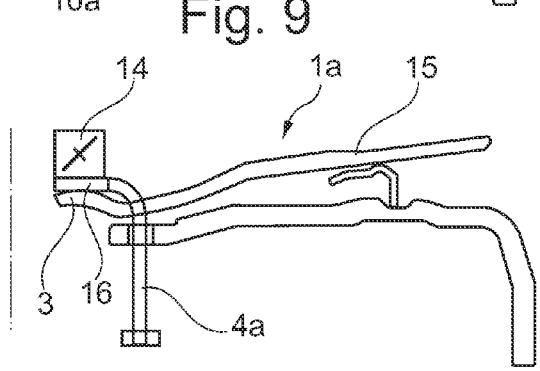

FIGS. 9 to 11 show the clutch unit 1a and the function of the transport lock 2a of FIG. 7 in each case on the basis of a schematic half-section in different states before final assembly in the drivetrain and during operation. FIG. 9 shows the clutch unit in the finished, not yet installed state. The already twisted catch hooks 4a form an undercut on the axial stop 12 of the housing 6, as a result of which the catch arms 4a arranged on the annular part 16 and guided through the intermediate spaces 17 between the lever elements 15 hold the lever elements 15 axially under preload by virtue of the annular part 16 being supported on the lever tips 3. FIGS. 10 and 11 show the clutch unit 1a in the installed state when the clutch is open, that is to say in the disengaged position (FIG. 10) and when the clutch is closed, that is to say in the engaged position (FIG. 11). Here, corresponding to the illustration of FIGS. 5 and 6, the lever elements 15 are loaded by the actuating bearing 14. In contrast to said Figures, the catch arms 4a need not be fastened to the lever elements 15, since the annular part 16, in the installed state of the clutch unit 1a, is braced between the actuating bearing 14 and the lever tips 3.

Figure 12:
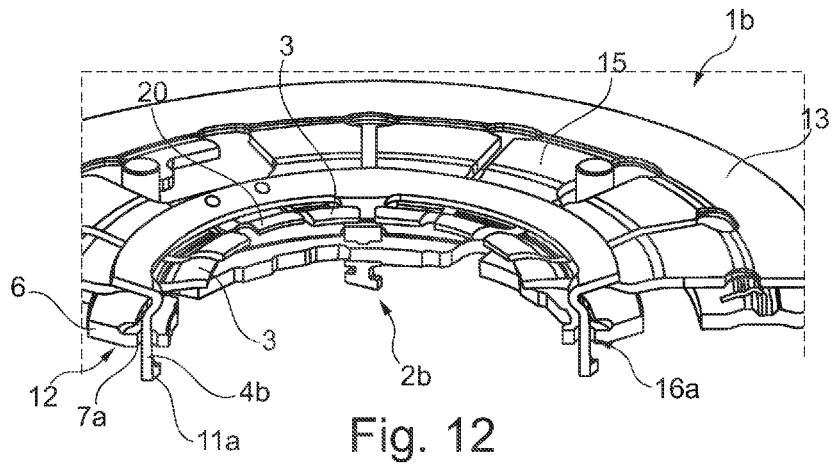
FIG. 12 shows an alternative exemplary embodiment of a clutch unit to the clutch units shown in FIGS. 2 to 11.

FIG. 12 shows a variant of the clutch unit 1a shown in FIGS. 7 to 11 in the form of the clutch unit 1b, in which a modified annular part 16a is used to form the transport lock 2b. The annular part 16a is designed in terms of its diameter so as to be arranged radially outside the lever tips 3. As a result, the catch aims 4a are provided on the inner circumference of the annular part 16a. The design of the catch arms 4b and the leadthrough through the openings 7a of the housing 6 otherwise correspond to the clutch unit 1a of FIGS. 7 to 11. In contrast thereto, the annular part 16a has a plurality of—in this case three—circumferentially distributed tongues 20 which are directed radially inward and which substantially correspond to the inner diameter of the lever elements 15 of the lever spring 13 and which may be designed correspondingly to the lever tips 3.

In the non-installed state of the clutch unit 1b, the lever elements 15 are held, correspondingly to the explanations of the preceding FIGS. 2 to 11, under a slight preload by virtue in this case of the annular part 16a being supported axially on that side of the lever elements 15 which faces away from the housing 6, with the catch arms 4b which are integrally connected to the annular part 16a being supported, by means of the catch hooks 11a, on the axial stop 12 of the housing 6 on that side of the latter which faces away from the lever elements 15. However, the detail of the clutch unit 1b illustrated in FIG. 12 shows not the state of the clutch unit 1b not yet installed in the drivetrain, but rather an operating state in the installed position.

Figure 13:
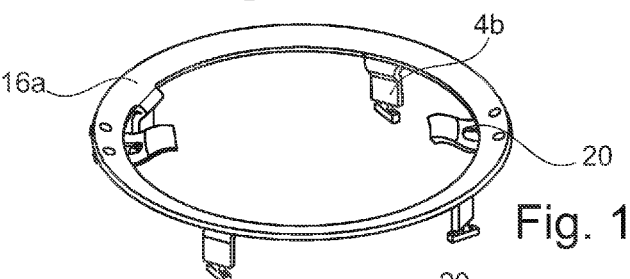
FIG. 13 shows an annular part of the transport lock of FIG. 12, FIGS. 14 to 16 show a schematic illustration of the mode of operation of the transport lock of the clutch unit of FIG. 12 in different operating states.

FIG. 13 shows the annular part 16a with the catch arms 4b and the radially inwardly directed tongues 20 in detail.

Figure 14:
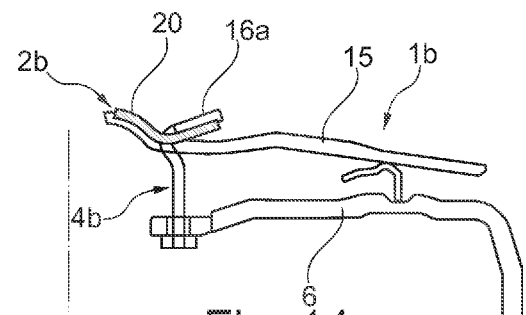
Figure 15:
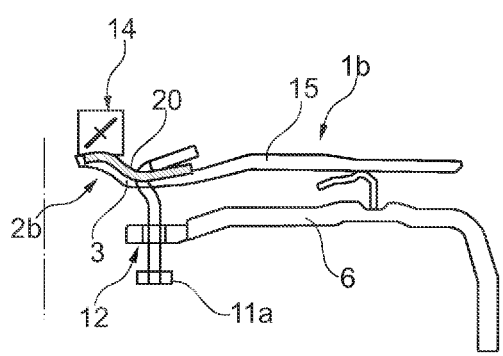
Figure 16:
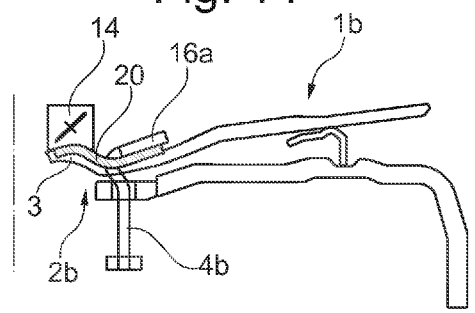

FIGS. 14 to 16 show the clutch unit 1b and the function of the transport lock 2b of FIG. 12 in each case on the basis of a schematic half-section in different states before final mounting in the drivetrain and during operation. FIG. 14 shows the clutch unit 1b in the non-installed state. As a result of the annular part 16a and the catch arms 4b, the lever elements 15 and housing 6 have a spacing to one to one another which does not permit a complete relaxation of the lever elements 15. The tongues 20 have no function in this state. FIGS. 15 and 16 show the clutch unit 1b in the installed state in each case in the disengaged and engaged positions. Here, the tongues 20, which as viewed circumferentially are situated in intermediate spaces between the lever tips, are loaded together with the lever tips 3 by the actuating bearing 14, such that—as shown in FIG. 15—the catch hooks 11a are lifted from the axial stop 12 of the housing already in the non-actuated state of the friction clutch as a result of more intense preloading of the lever elements 15 by the transport lock 2b. Correspondingly, when the friction clutch is engaged—as shown in FIG. 16—the annular part 16a and therefore the catch arms 4b are driven yet further by the tongues 20.

The exemplary embodiment shown in FIGS. 12 to 16 has the advantage that the tongues 20 provided in the intermediate spaces of the lever elements 16 have no axial space requirement between the actuating bearing 14 and the lever tips 3, such that axial installation space is saved.

Figure 17:
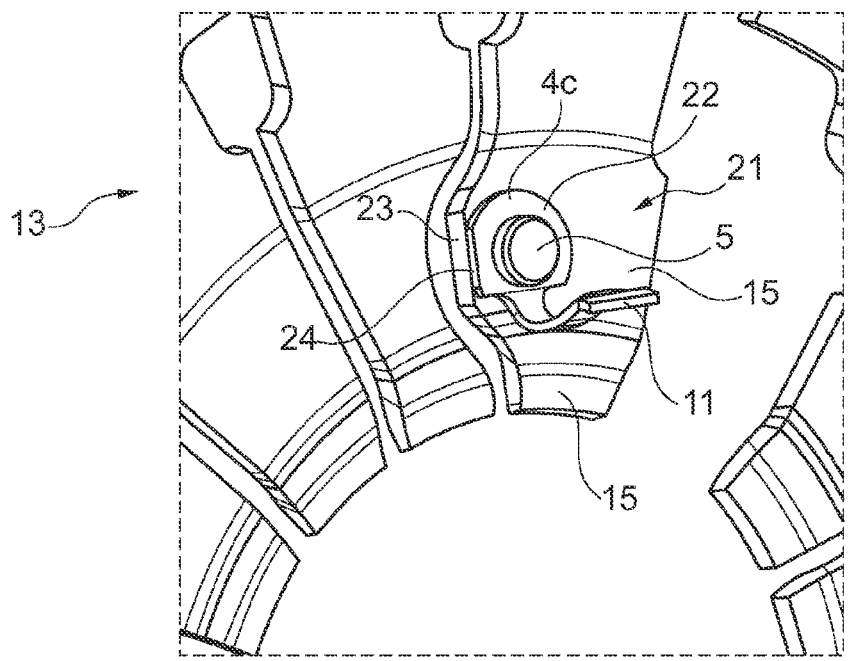
FIGS. 17 to 19 show detail illustrations of clutch units with catch arms positioned with respect to the lever elements.

FIG. 17 shows a detail view of a clutch unit similar to the clutch unit 1, with the lever spring 13 viewed from the inside of the clutch unit. The catch arm 4c is attached, for example—as shown—riveted by means of the head part 22 thereof and the rivet 5, to that side 21 of the lever element 15 which faces toward the housing 6 (FIG. 2). To position the catch arm 4c in particular with regard to the angular position of the catch hook 11 with respect to the lever element 13 and therefore with respect to the housing 6 and its openings 7 (FIG. 2), positioning surfaces 23, 24 are provided in each case on the lever element 15 and on the head part 22, which positioning surfaces 23, 24 are aligned relative to one another during the riveting process, for example by virtue of a common contact surface being introduced against which both positioning surfaces can be laid. It is self-evident that said process may take place simultaneously for all catch arms 4c distributed over the circumference at the same time and if appropriate by means of a single centering tool.

Figure 18:
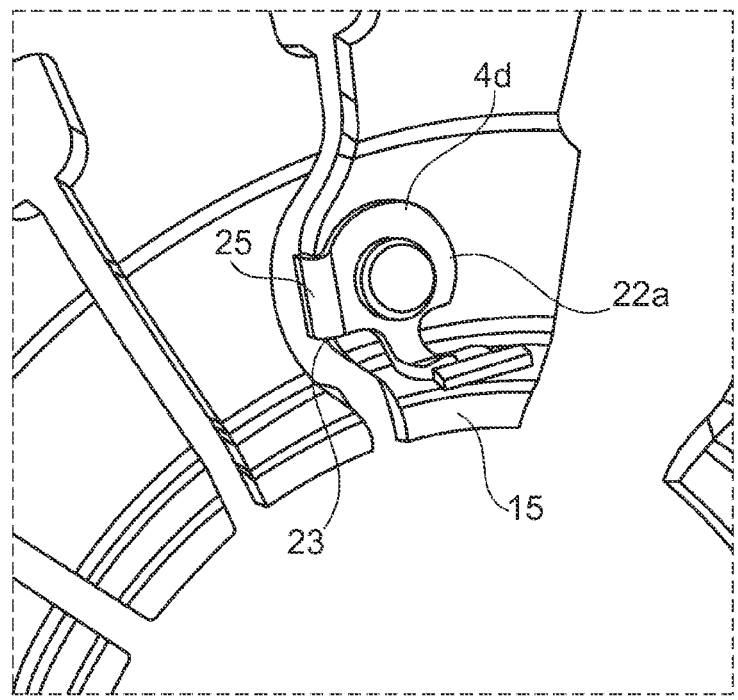

FIG. 18 shows a further solution to the embodiment of FIG. 17 for the positioning of the catch arm 4d on the lever element 15. For this, the head part 22a has an axially folded-over projection 25 which is laid against the positioning surface 23 of the lever element.

Figure 19:
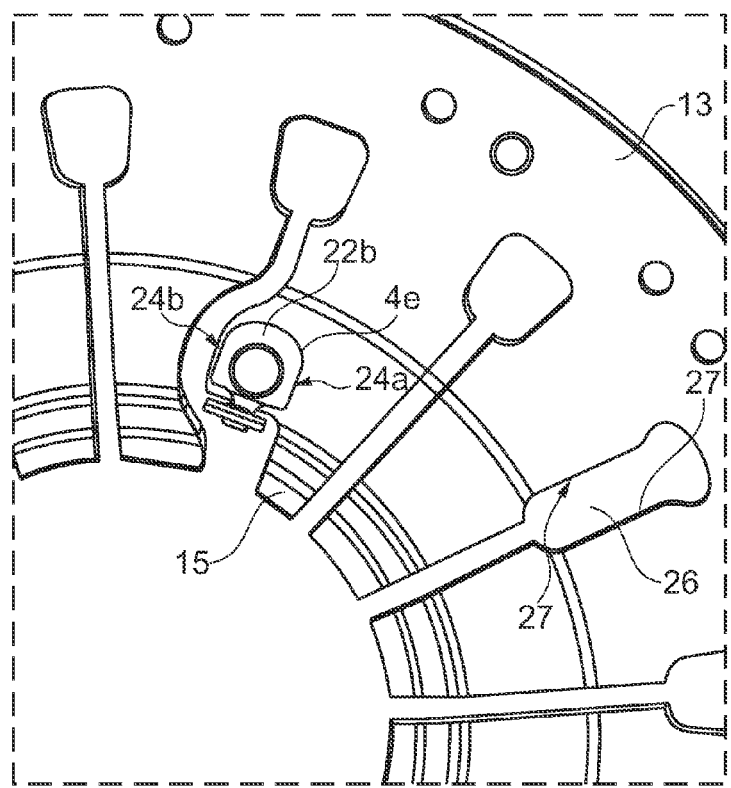

FIG. 19 shows a further, alternative embodiment, modified in relation to the exemplary embodiments of FIGS. 17 and 18, of a catch arm 4e positioned on the lever element 15. For this, the head part 22b has two positioning surfaces 24a, 24b. For this, at least one, preferably a plurality of centering openings 26 with positioning surfaces are provided on the lever spring 13, with respect to which positioning surfaces the catch arm, or said catch arm and the further catch arms (not illustrated) distributed over the circumference, are positioned during the riveting process. For this purpose, provision may be made of a common centering tool, for example in the form of a jig, which is aligned with the centering openings 26 and into the openings of which the catch arms 4e are inserted.

Figure 20:
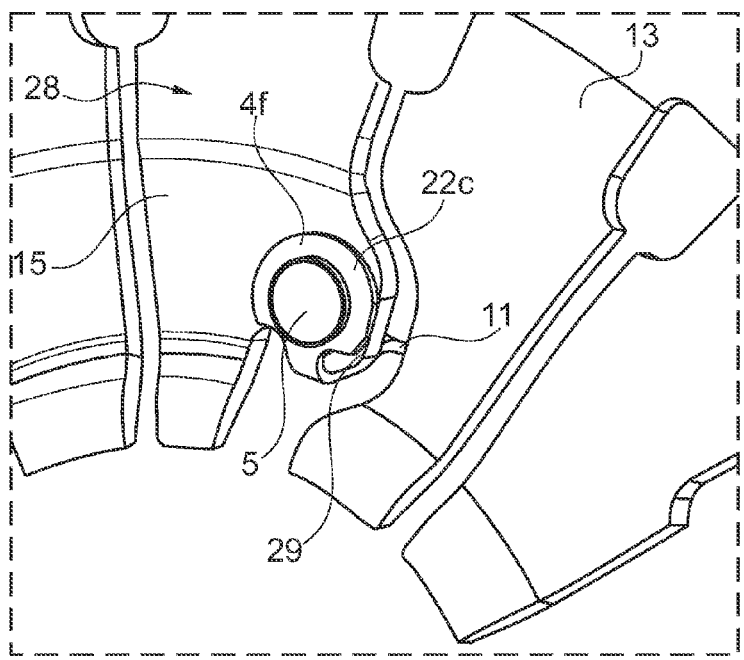
FIG. 20 shows a detail of a clutch unit having a lever arm fastened to a side, which is situated opposite the housing, of a lever element.
Figure 22:
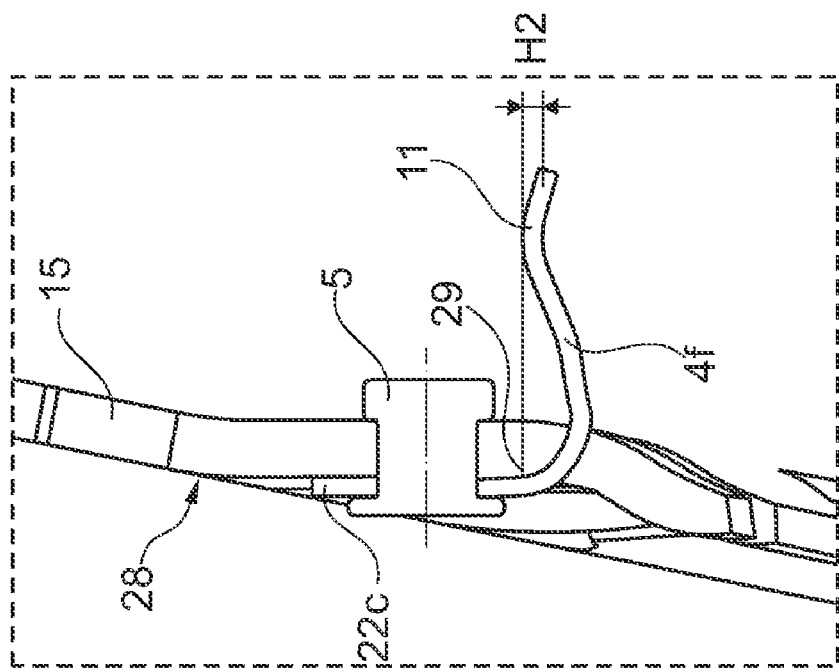
FIGS. 21 and 22 show a comparison, in section, of catch arms arranged on the lever elements at different sides.
Figure 21:
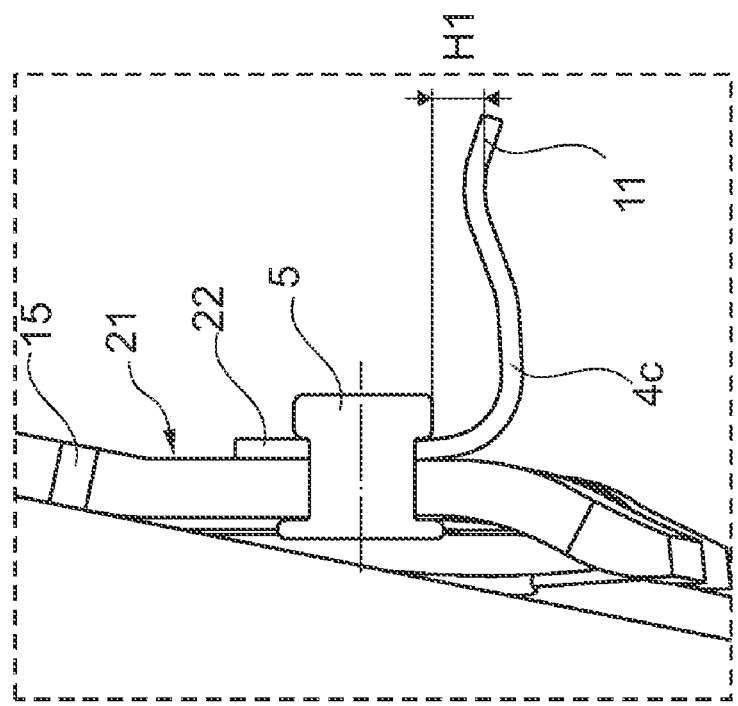

FIG. 20 shows a detail, in a view of the lever spring 13 from the outside, of an arrangement of the catch arms 4f on the lever element 15 alternative to the arrangement of FIGS. 2 to 6 and 17 to 19. Here, the head part 22c is arranged on that side 28 of the lever element 15 which faces away from the housing 6 (FIG. 2), such that the catch arm 4f engages axially over the lever element 15 for example by virtue of the lever element 15 being radially partially cut out—as is shown—or by virtue of the catch arm being led through between two adjacent lever elements. Here, the tensile force of the catch hook 11 for axially securing the lever spring 13 is supported over a large area via the head part 22c on the lever element 15, such that the rivet 5 is subjected at most to a reduced tensile loading and the area of the closing head thereof can be reduced and the catch arm 4f can thereby—if desired—be relocated radially inward for the same material loading. As a result of the axial support of the catch arm 4f by means of the head part 22c on the edge 29 of the lever element 15, the lever conditions, defined by the radial spacing between the catch hook 11 and edge 29, under tensile loading are positive because smaller lever spacings can be set. In this regard, FIGS. 21 and 22 show a comparison of the different types of fastening of the catch arms to the sides 21, 28 of the lever element 15. Here, the levers H1, H2 set between the catch hook 11 and the axial support of the head parts 22, 22c influence the material stress of the catch arms 4c, 4f.

In FIG. 21, the catch arm 4c is riveted by means of the rivet 5 to the lever element 15 on that side 21 which faces toward the housing 6 (FIG. 2). Under tensile loading of the catch hook 11, the head part 22 is supported axially, so as to set the lever H1, on the rivet head of the rivet 5. In FIG. 22, the catch arm 4f is riveted by means of the rivet 5 to the lever element 15 on that side 28 which faces away from the housing 6 (FIG. 2). Under tensile loading of the catch hook 11, the head part 22c is supported on the edge 29 of the lever element 15, as a result of which a lever H2 smaller than the lever H1 of FIG. 21 is set between the head part 22c and the catch hook 11.

LIST OF REFERENCE SYMBOLS

1 Clutch Unit
1a Clutch Unit
1b Clutch Unit
2 Transport Lock
2a Transport Lock
2b Transport Lock
3 Lever Tips
4 Catch Arm
4a Catch Arm
4b Catch Arm
4c Catch Arm
4d Catch Arm
4e Catch Arm
5 Rivet
6 Housing
7 Opening
7a Opening
8 Inner Circumference
9 Slot
10 Free End
10a Free End
11 Catch Hook
11a Catch Hook
12 Axial Stop
13 Lever Spring
14 Actuating Bearing
15 Lever Elements
16 Annular Part
16a Annular Part
17 Intermediate Space
18 Profile
19 Annular Surface
20 Tongue
21 Side
22 Head Part
22a Head Part
22b Head Part
22c Head Part
23 Positioning Surface
24 Positioning Surface
24a Positioning Surface
24b Positioning Surface
25 Projection
26 Centering Opening
27 Positioning Surface
28 Side
29 Edge
101 Clutch Unit
102 Friction Clutch
103 Friction Clutch
104 Clutch Disk
105 Clutch Disk
108 Counterpressure Plate
108a Bearing
109 Pressure Plate
110 Pressure Plate
111 Drive Plate
112 Housing 115 Lever Element
116 Lever Element
117 Traction Means
117a Lug
120 Adjusting Ring
124 Sensor Ring
125 Sensor Element
128 Adjusting Ring
131 Sensor Ring
132 Sensor Element
150 Leaf Pring Pack
151 Connecting Point
152 Positioning Pin
153 Transport Lock
154 Transport Lock
155 Frame-Like Region
156 Support Tongue
H1 Lever
H2 Lever

The invention claimed is:

1. A clutch unit, comprising:
 at least one friction clutch;
 a housing having a rear side and a front side;
 at least one pressure plate connected to the housing for conjoint rotation with the housing and axially movable to a limited extent;
 a counterpressure plate which is connectable to the housing;
 a plurality of lever elements having radially inner lever tips, the lever elements being annularly arranged between the housing and the pressure plate, the pressure plate and the lever elements being subjected to a load at the radially inner lever tips to close the friction clutch; and
 a transport lock having catch arms and catch hooks, the catch arms each having a first end mounted to the lever elements so as to extend axially in a direction of the counterpressure plate from the lever elements, and the catch hooks being arranged at a second end of each of the catch arms so as to extend laterally in a first direction and in a second direction from the second end of the catch arms, the catch arms being movable with the lever elements in a first direction and in a second direction and the lever tips being secured axially, in a non-installed state, by the catch hooks, the catch hooks being configured and arranged to engage axially with the rear side of the housing so that the catch hooks are supported on the rear side of the housing.

2. The clutch unit as claimed in claim 1, wherein the catch arms are supported or held at one end on the lever tips.

3. The clutch unit as claimed in claim 2, wherein the housing has openings through which the catch arms are guided and the openings have a profile that forms an axial stop for the catch hooks.

4. The clutch unit as claimed in claim 3, wherein the openings formed in the housing are slots, the slots are widened in a radial direction on an inner circumference of the housing, and the catch arms are inserted into the slot.

5. The clutch unit as claimed in claim 4, wherein the catch arms are integrally formed with the catch hooks, wherein the catch hooks have a width that is wider than a width of the catch arms so that during an axial movement and mounting of the lever elements on the housing the catch arms bear, in a first state, under radial preload against the inner circumference of the housing, and in the second state, the catch arms snap into the slots formed in the housing.

6. The clutch unit as claimed in claim 5, wherein the catch arms, during the mounting, are calibrated on the inner circumference by plastic deformation and spring elastically into the slots.

7. The clutch unit as claimed in claim 3, wherein the catch arms have a profile and are each inserted into an opening in the housing having a complementary cross-section with the catch hooks formed on a free end of the catch arms and angled from the catch arms.

8. The clutch unit as claimed in claim 1, wherein the catch arms are fastened to an axially inner surface of the lever elements.

9. The clutch unit as claimed in claim 8, wherein the lever elements are joined together to form a lever spring, and the catch arms have a support surface supported with respect to the lever element elements on a side of the lever spring opposing the housing, and the catch arms engage axially over the lever elements.

10. The clutch unit as claimed in claim 9, wherein the catch have head parts which extend from an end of the catch arms, opposite that of the catch hooks that are in contact with the lever elements during fastening of the catch arms to the lever elements.

11. The clutch unit as claimed in claim 10, wherein the lever elements each have a positioning surface in a region of the head parts and the head parts have a positioning surface which is brought into alignment with the positioning surface of the lever elements.

12. The clutch unit as claimed in claim 11, wherein the head parts have a projection extending in a direction opposite the catch arms that bears against the positioning surface of the lever elements.

13. The clutch unit as claimed in claim 10, wherein the lever spring has at least one centering window and the head parts are positioned with respect to the centering window, with a centering tool, relative to the lever elements which hold the catch arms.

14. The clutch unit as claimed in claim 1, further comprising an annular part, which is supported axially on the lever elements, having catch arms.

15. The clutch unit as claimed in claim 14, wherein the annular part and catch arms are formed in one piece.

16. The clutch unit as claimed in claim 15, further comprising an actuating bearing, the annular part has a plurality of circumferentially distributed, radially inwardly aligned tongues which are driven by the actuating hearing.

17. The clutch unit as claimed in claim 16, wherein the catch arms are arranged on an inner circumference of the annular part.

18. The clutch unit as claimed in claim 14, further comprising an actuating bearing having a diameter, and the hearing rests on the annular part and subjects the annular part to an axial load.

19. The clutch unit as claimed in claim 15, wherein, the catch arms are arranged at an outer circumference of the annular part.

* * * * *